United States Patent
Dong et al.

(10) Patent No.: US 10,602,332 B2
(45) Date of Patent: Mar. 24, 2020

(54) PROGRAMMING ORGANIZATIONAL LINKS THAT PROPAGATE TO MOBILE APPLICATIONS

(71) Applicant: MICROSOFT TECHNOLOGY LICENSING, LLC, Redmond, WA (US)

(72) Inventors: Zhihua Dong, Bellevue, WA (US); Nathaniel T. Clinton, Redmond, WA (US); David M. Cohen, Duvall, WA (US); Kin Man Yau, Bellevue, WA (US); Quanjie Lin, Redmond, WA (US); Andrew C. Haon, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 267 days.

(21) Appl. No.: 15/299,416

(22) Filed: Oct. 20, 2016

(65) Prior Publication Data

US 2017/0366916 A1  Dec. 21, 2017

Related U.S. Application Data

(60) Provisional application No. 62/352,123, filed on Jun. 20, 2016.

(51) Int. Cl.
*G06F 15/16* (2006.01)
*H04W 4/50* (2018.01)
(Continued)

(52) U.S. Cl.
CPC .......... *H04W 4/50* (2018.02); *G06F 16/9562* (2019.01); *H04L 67/02* (2013.01); *H04L 67/16* (2013.01)

(58) Field of Classification Search
CPC ....... H04L 67/02; H04L 67/28; H04L 67/288; H04L 67/2828; H04L 67/2858;
(Continued)

(56) References Cited

U.S. PATENT DOCUMENTS 6,345,279 B1  2/2002  Li et al.
8,386,915 B2  2/2013  Howes et al.
(Continued)

FOREIGN PATENT DOCUMENTS

CN  103324710 A  9/2013

OTHER PUBLICATIONS

Laakko, Timo, "Context-Aware Web Content Adaptation for Mobile User Agents", In Publication of Springer, Retrieved on: Jun. 23, 2016, 5 pages.
(Continued)

*Primary Examiner* — Farzana B Huq
(74) *Attorney, Agent, or Firm* — Michael Best & Friedrich LLP

(57) ABSTRACT

The ability for an organization's administrator to customize assets and content that, their users have access to is a substantial capability. This capability is not just to facilitate delivery of the correct content to the relevant audience, but is also important to ensure that the content is appropriate for the endpoint. The administrator may curate organizational links that are provided as a hierarchical directory of sites and applications for the organization. Embodiments are directed to programming the organizational links that propagate to mobile applications. A server side application programming interface (API) may be provided to access a organization's curated links, a web user experience may be provided to enable the administrator to manage and curate the organizational links, and a mobile-specific user experience may be provided for viewing the links in a manner that enables
(Continued)

quick access to the most relevant content to users of the organization.

18 Claims, 11 Drawing Sheets

(51) Int. Cl.
*G06F 16/955* (2019.01)
*H04L 29/08* (2006.01)

(58) Field of Classification Search
CPC ....... H04L 67/42; H04L 12/66; H04L 65/602; H04L 65/608; H04L 65/80
USPC ........................................ 709/217, 206, 225
See application file for complete search history.

(56) References Cited

U.S. PATENT DOCUMENTS

| | | | |
|---|---|---|---|
| 8,495,658 B2 | 7/2013 | Zakon et al. | |
| 8,954,102 B2 | 2/2015 | Hewes et al. | |
| 9,231,949 B1 | 1/2016 | Jenkins et al. | |
| 2005/0021862 A1 | 1/2005 | Schroeder et al. | |
| 2006/0168095 A1 | 7/2006 | Sharma et al. | |
| 2008/0288515 A1* | 11/2008 | Kim | G06F 17/30905 |
| 2009/0044126 A1* | 2/2009 | Wyler | G06F 17/30905 715/734 |
| 2010/0145924 A1* | 6/2010 | Zabramski | G06F 17/30905 707/709 |
| 2011/0179425 A1* | 7/2011 | Zakon | G06F 8/20 719/316 |
| 2011/0265169 A1 | 10/2011 | Bauer-Hermann et al. | |
| 2012/0233235 A1 | 9/2012 | Allaire et al. | |
| 2012/0317244 A1* | 12/2012 | Liang | H04L 67/02 709/219 |
| 2013/0212191 A1 | 8/2013 | Suraj et al. | |
| 2014/0258523 A1 | 9/2014 | Kazerani et al. | |
| 2015/0156061 A1* | 6/2015 | Saxena | H04W 4/50 715/733 |
| 2015/0324897 A1* | 11/2015 | Venters, III | G06Q 30/02 705/14.51 |
| 2016/0112492 A1* | 4/2016 | Tian | G06F 17/30902 709/217 |

OTHER PUBLICATIONS

Butler, et al., "Device independence and the Web", In Proceedings of IEEE Internet Computing, vol. 6, Issue 5, Sep. 2002, pp. 81-86.

"International Search Report and Written Opinion Issued in PCT Application No. PCT/US2017/036931", dated Aug. 14, 2017, 9 Pages.

Millen, et al., "Dogear: Social Bookmarking in the Enterprise", In Proceedings of the SIGCHI Conference on Human Factors in Computing Systems, Apr. 22, 2006, pp. 111-120.

* cited by examiner

PROGRAMMING ORGANIZATIONAL LINKS THAT PROPAGATE TO MOBILE APPLICATIONS

CROSS-REFERENCE TO RELATED APPLICATION

This application claims benefit under 35 U.S.C. § 119(e) U.S. Provisional Application No. 62/352,123 filed on Jun. 20, 2016. The U.S. Provisional Application herein incorporated by reference in its entirety.

BACKGROUND

For administrators or curators in the content world, the ability to customize assets and corneal that their users have access to is a substantial capability. The ability to customize assets and content is not just to facilitate delivery of the correct content to the relevant audience, but is also important to ensure that the content is appropriate for the endpoint (for example, the web vs. a client application on a device). A resource such as a specific application or access to a company asset through a well-designed user experience may be meaningless if the user experience is not optimized for different platforms or devices.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to programming organizational links that propagate to mobile applications. A server side application programming interface (API) may be provided to access one or more links and a web user experience associated with the links, a subset of links from the links and a plurality of attributes associated with the subset of links may be determine, and the subset of links may be provided to a mobile application through the API based on the attributes to be presented through a user experience of the mobile application.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
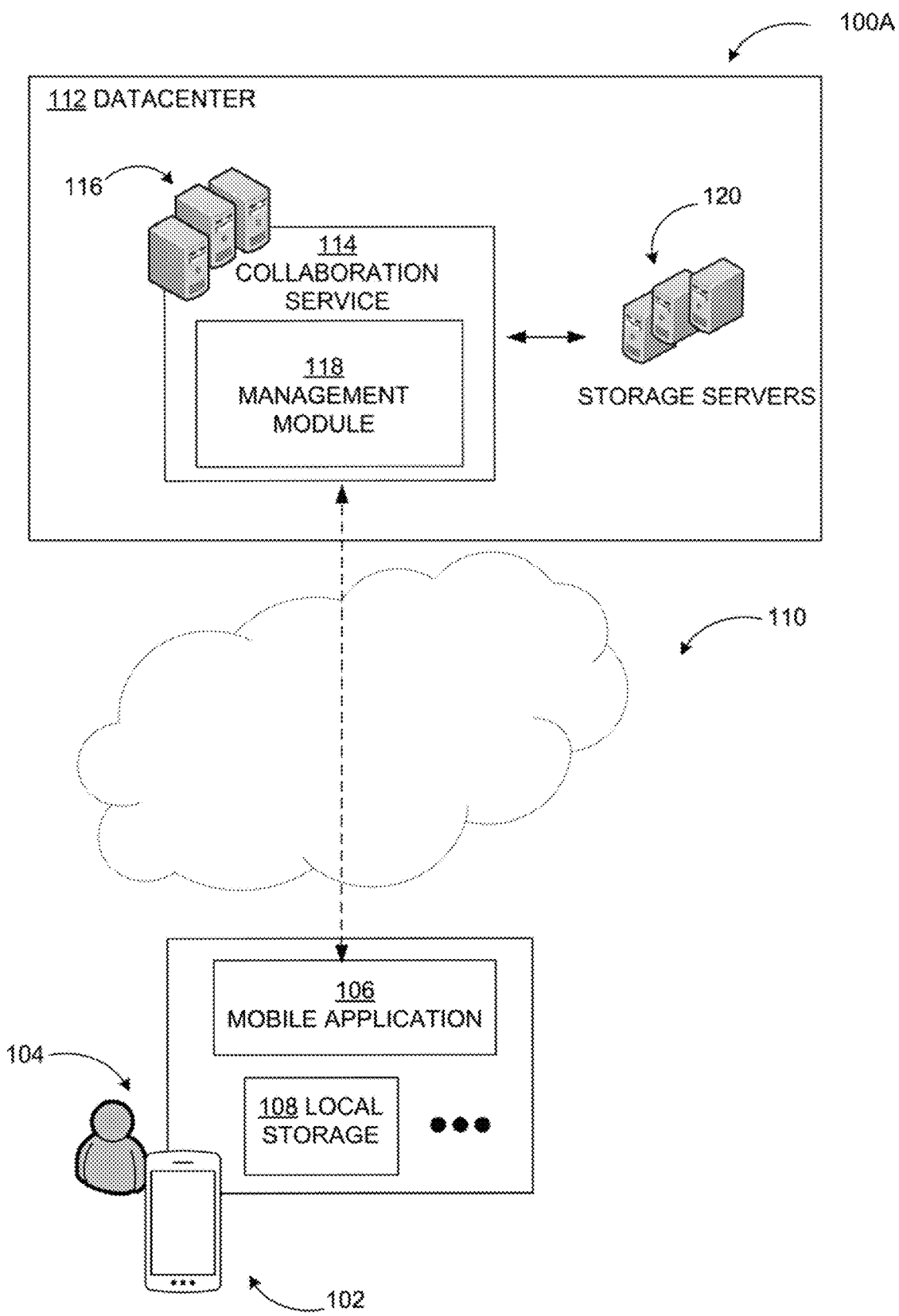
FIGS. 1A-C include display diagrams illustrating example network environments where programming of organizational links that propagate to mobile applications may be implemented.

As briefly described above, embodiments are directed to programming organizational links that propagate to mobile applications. Customization of assets and content for users of an organization is an important capability for administrators or curators of the organization to implement. For example, the content may include organization-related portals or links and/or resources that help the user navigate their work, school, and/or organization "life". A system according to embodiments may provide a server side application programming interface (API) that provides access to a tenant's curated links, a web user experience (e.g., a collaboration service homepage) that provides for management and curation of those links, and a mobile experience that provides for a mobile-specific user experience for viewing the links.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to programming organizational links that propagate to mobile applications. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1B:
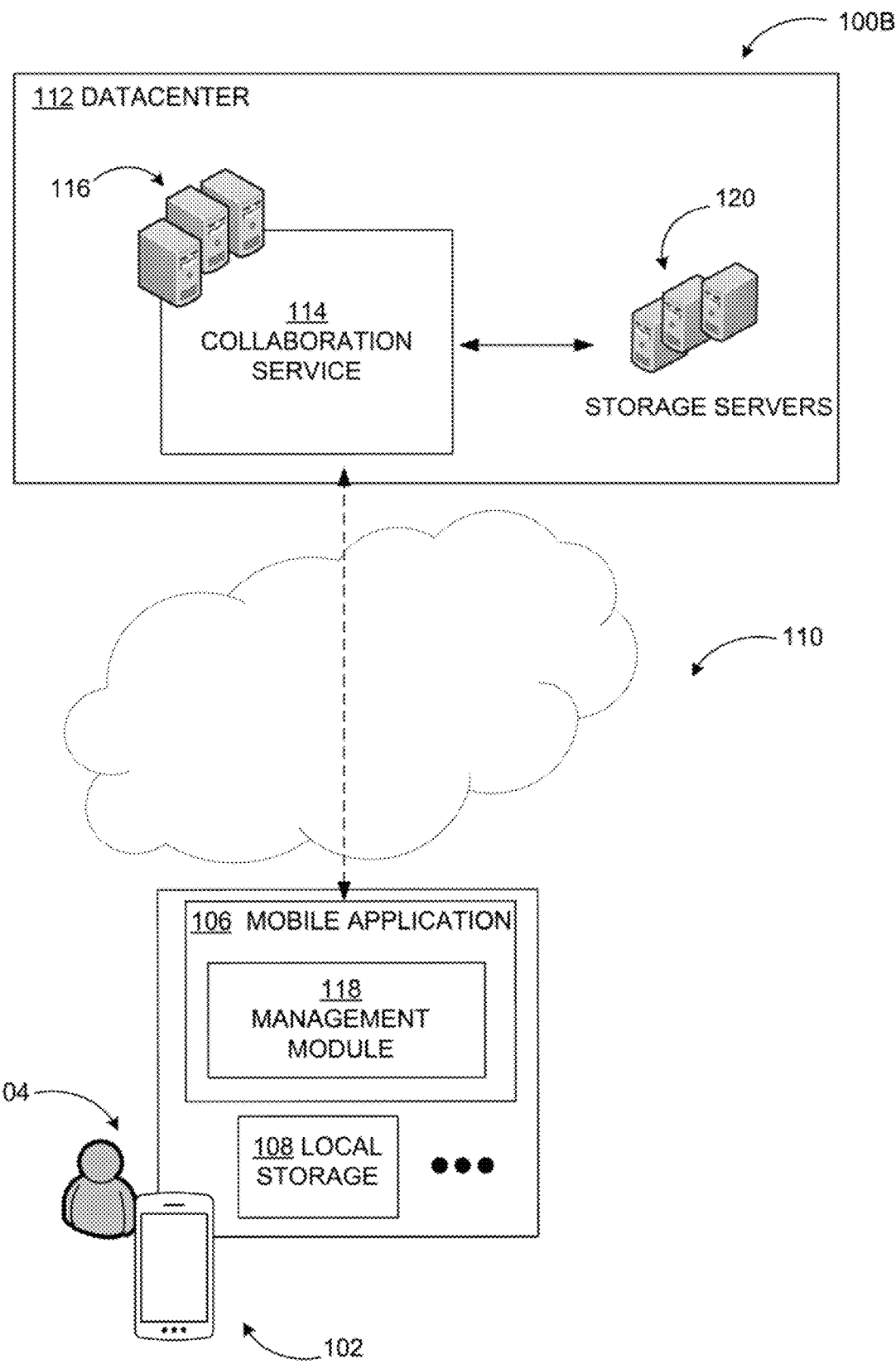
Figure 1C:
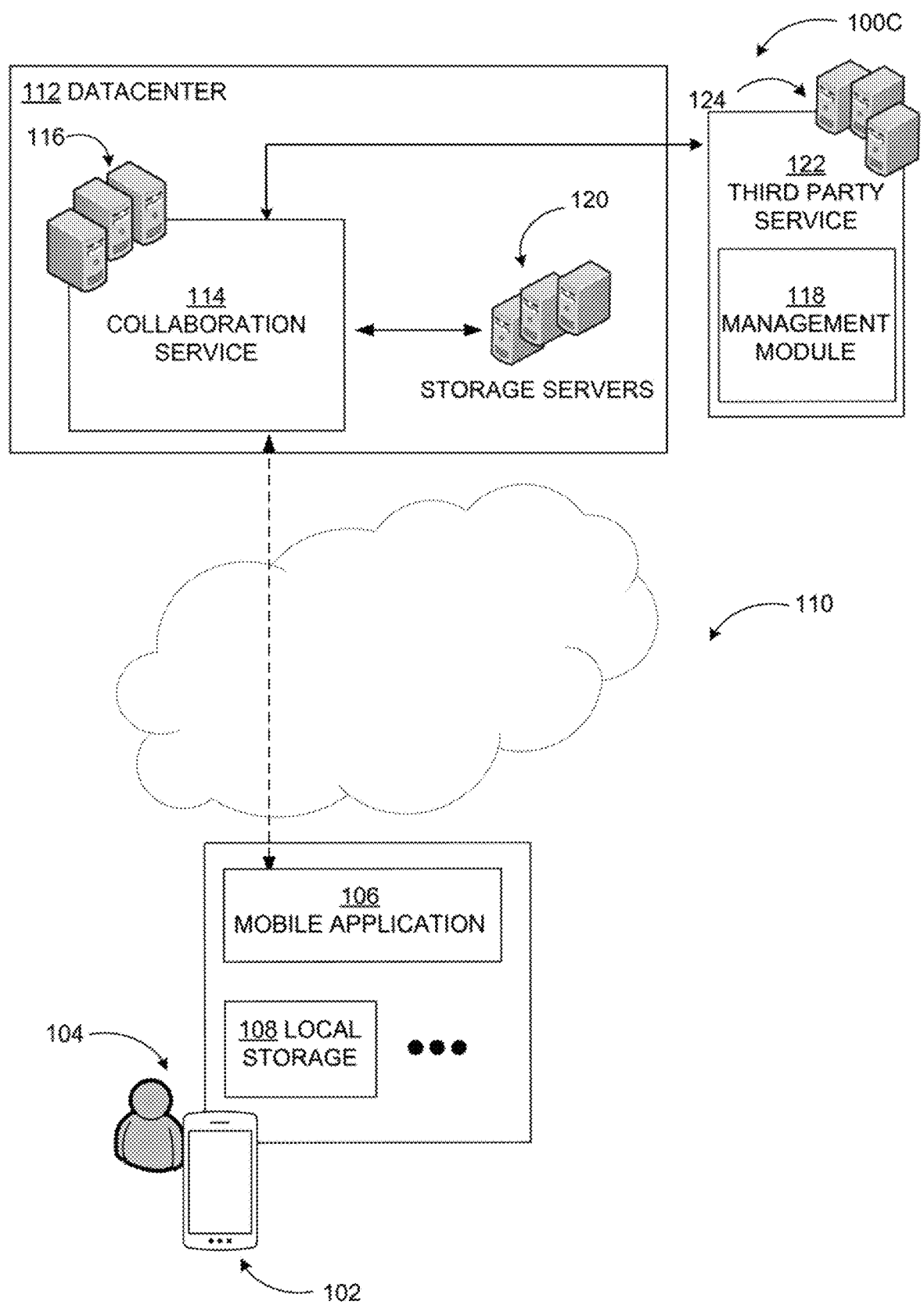

FIGS. 1A-C include display diagrams illustrating example network environments where programming of organizational links that propagate to mobile applications may be implemented. As illustrated in diagrams 100A-C, an example system may include a datacenter 112 hosting a cloud-based collaboration service 114 configured to enable users to create, edit, and/or share content among multiple devices and across a variety of platforms. The datacenter 112 may include one or more processing servers 116 configured to execute the collaboration service 114, among other components. The datacenter 112 may also include one or more storage servers 120 configured to manage one or more data stores comprising data associated with the collaboration service 114. As described herein, the collaboration service 114 may be implemented as software, hardware, or combinations thereof.

In some embodiments, the collaboration service 114 may be configured to interoperate with various applications. For example, as illustrated in the diagrams 100A-C, a user 104 may execute a thin (e.g., a web application client) or a thick (e.g., a locally installed mobile client application) version of a mobile application 106 through a device 102 with which the collaboration service 114 may be configured to integrate and interoperate with over one or more networks, such as network 110. The mobile application 106 may be an application hosted by the collaboration service 114. The device 102 may include a desktop computer, a laptop computer, a tablet computer, a vehicle mount computer, a smart phone, or a wearable computing device, among other similar devices. A communication interlace may facilitate communication between the collaboration service 114 and the mobile application 106 over the network 110.

In one embodiment, as illustrated in diagram 100A, at least one of the processing servers 116 may be operable to execute a management module 118 of the collaboration service 114, where the management module 118 may be integrated with the collaboration service 114 to program organizational links that propagate to mobile applications. In another embodiment, as illustrated in diagram 100B, the mobile application 106 may be operable to execute the management module 118, where the management module 118 may be integrated with the mobile application 106. In a further embodiment, as illustrated in diagram 100C, the management module 118 may be a separate module associated with and/or executed by one or more processing servers 124 of a third party service 122 configured to serve multiple applications, such as the mobile application 106 of the collaboration service 114.

In an example embodiment, the user 104 may be an administrator of an organization. The user 104 may curate organizational links that are provided as a hierarchical directory of sites and applications for the organization, where the organization may be a tenant of the collaboration service 114. An example version may be provided as an "organization promoted links" feature and may include multiple features that allow the user 104, as an administrator, to delegate editing permission to non-administrators to configure a set of destinations for end-users on a collaboration service view of a mobile application user experience. The hierarchical structure may be introduced to group links into different categories, where the curated organizational links may take a top-level position over other external links, for example. As the links feature grows as more links are curated, a subset of the links may be determined and shown as a small list for quick access. Additionally, the subset of links may be selected and presented to target different segments of the organization's audience based on end user roles.

For example, the management module 118 may be configured to provide a server side API to access one or more of the curated links and a web user experience associated with the curated links. The API may be public, and consumed by the collaboration service 114 and mobile application 106. Therefore, the collaboration service 114 or the mobile application 106 may be able to directly call the API.

The management module 118 may be configured to determine a subset of links from the curated links and a plurality of attributes associated with the subset of links. By determining the subset of links, and upon presentation of the subset of links described below, quick access to the most relevant content may be provided to the users of the organization. For each link within the subset of links, a naming and a destination of the link may be determined. For example, a title and a category of each link may be determined. The category may be based on a type of each link. Example types may include a service web link, a list link, a document link, a folder link, and/or an external web link. In some embodiments, the title and the category of each link may be indexed to enable search features, auto-completion features, and auto-suggestion features.

The attributes associated with the links may include an order of links, a platform for the links (for example, a mobile platform, a web platform, or both), a grouping of the links, and a priority of the links. The priority of the links may be determined based on a geographical structure, an organizational structure, and/or a popularity of each link, where popularity may be based on whether the link is a link of the week, or a hot link based on a recent event such as earthquake, a big company launch event, or a power outage, for example. In an example scenario, an emergency may occur in London, and a user may reside in Washington State. Although the link to information about the emergency in the London may be a highly popular link, the distant geographical location of the user to London would cause the link to not be prioritized and presented within the subset of links.

The management module 118 may then be configured to provide the subset of links to a mobile application 106 through the API based on the attributes to be presented through a user experience of the mobile application 106. As previously discussed, the mobile application 106 may be a mobile client application installed and stored locally in local storage 108 of the device 102, or the mobile application 106 may be a web application client. If the mobile application 106 is a mobile client application, then the user experience may be a native mobile user experience. If the mobile application 106 is a web application client, then the user experience may be hosted slew of a web user experience. Users of the organization, including the user 104, may be enabled to edit a link, add a new link, delete an existing link, and/or re-order links within the presented subset of links through the user experience of the mobile application.

In some scenarios, no links may be accessible. For example, the organization may be new and thus no links have yet been curated, or all of the existing content may have been removed and thus no links remain. If no links are accessible, a custom view may be displayed within the mobile application user experience that provides details regarding the links feature and prompts the users of the organization, including the user 104, to add links to take advantage of the links feature.

As previously discussed, for administrators, the ability to customize assets and content that their users have access to is a substantial capability. The ability to customize assets and content is not just to facilitate delivery of the correct content to the relevant audience, but is also important to ensure that the content is appropriate for the endpoint. A resource such as a specific application or access to a company asset through a well-designed user experience may be meaningless if the user experience is not optimized for different platforms or devices. Embodiments, as described herein, for programming organizational links that propagate to mobile applications may enable increased security and efficiency in user interaction and data management, reduced processing and network bandwidth usage, and improved user interaction by allowing users to access assets and content efficiently and with a consistent experience regardless of what platform or device they are using without having to install and employ custom solutions.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with creation, editing, and/or sharing of content through collaboration services hosted across a variety of platforms and devices, specifically mobile platforms and devices.

Figure 2:
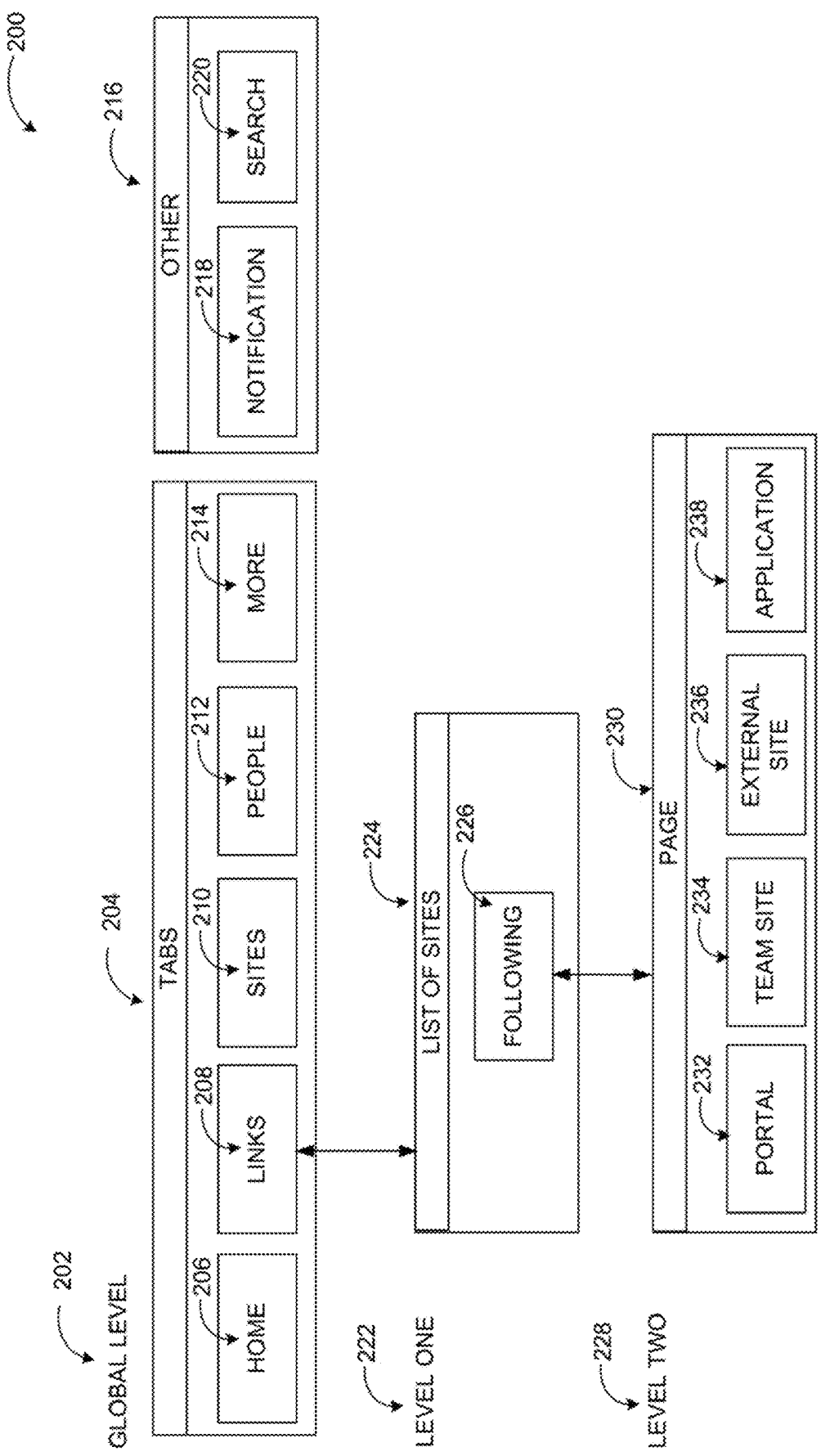
FIG. 2 includes a display diagram illustrating an example architecture of a mobile application user experience for presenting links.

FIG. 2 includes a display diagram illustrating an example architecture of a mobile application user experience for presenting links. As previously discussed in conjunction with FIG. 1, an administrator may curate organizational links that are provided as a hierarchical directory of sites and applications for the organization, where the organization may be a tenant of the collaboration service. A management module associated with the collaboration service may be configured to program the organizational links that propagate to a mobile application. The management module may be configured to provide a server side API to access one or more links and a web uses expedience associated with the one or more links, determine a subset of links from the one or more links and a plurality of attributes associated with the subset of links, and provide the subset of links to the mobile application through the API based on the attributes to be presented through a user experience of the mobile application. Provision of the subset of links, for presentation through the user experience of the mobile application may enable quick access to the most relevant content to the users of the organization.

As shown in a diagram 200, the mobile application user experience for the collaboration service may comprise various levels, including a global level user experience 202, a level one user experience 222, and a level two user experience 228. The global level user experience 202 (or a collaboration service view) may be displayed upon execution of the mobile application on a device. The global level user experience 202 may comprise one or more tabs 204. The tabs 204 may include a home tab 206, a links tab 208, a sites tab 210, a people tab 212, and an option to view more tabs 214. The global level user experience 202 may also comprise other elements 216, such as a notification feature 218 and a search feature 220. The home tab 206 may be the default tab selected upon execution of the mobile application. In an example scenario, a user may select the links tab 208 through the global level user experience 202.

In response to the selection of the links tab 208, the level one user experience 222 (or a links tab view) may be displayed. The level one user experience 222 may include a list of sites 224, where the list of sites comprises the subset of links. The list of sites may be presented within a pivot, such as "following" 226, indicating that the lists of sites 224 may be comprised of links that are being followed by the user and/or an organization associated with the user. The user may select a link from within the list of sites 224.

In response to selection of the link within the list of sites 224, the level two user experience 228 (or page view) may be displayed. The level two user experience 228 may include a page 230 that, may be located within one or more of a portal 232 of the organization, a team site 234 associated with the organization, an external site 236, or an application 238.

Figure 3:
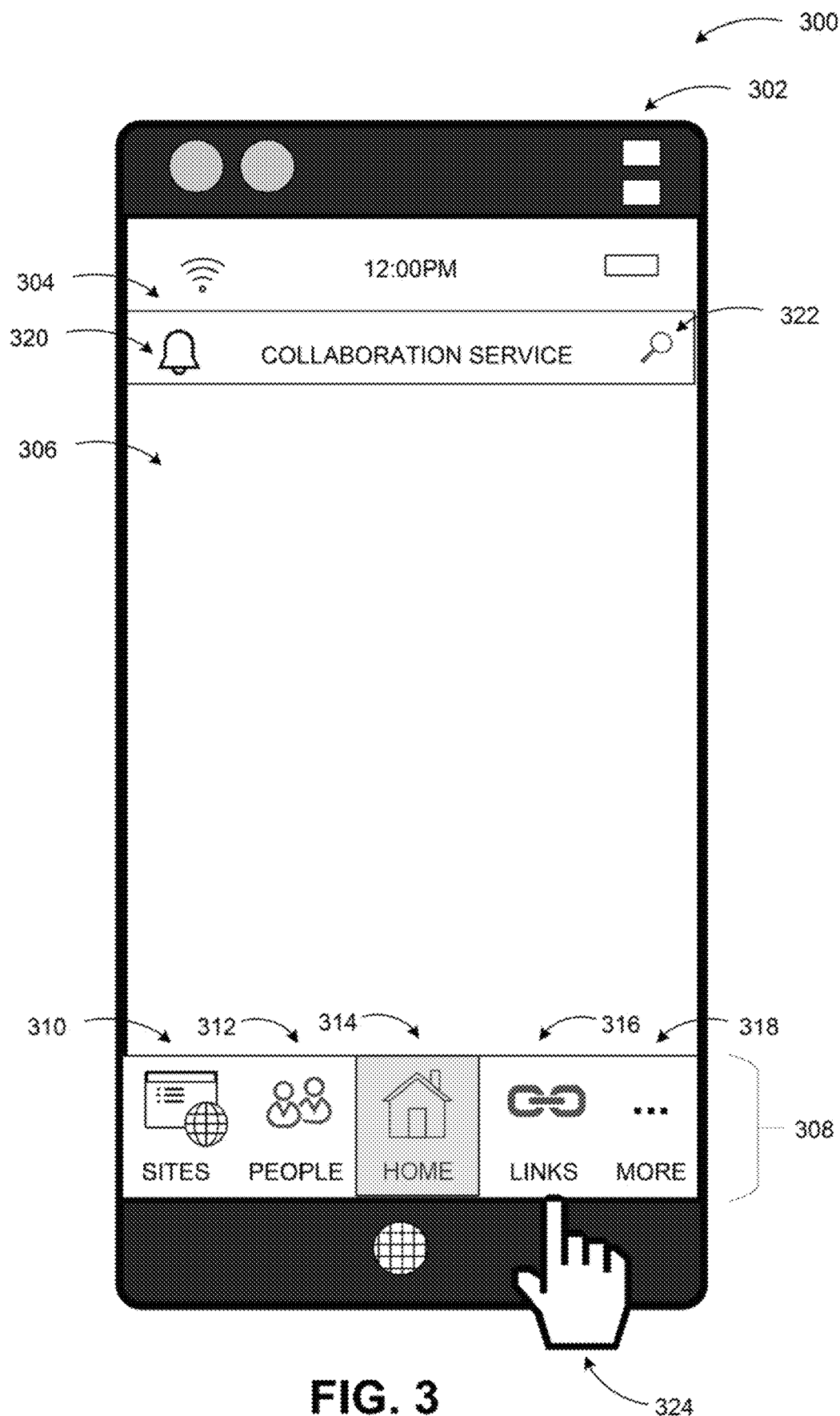
FIG. 3 includes a display diagram illustrating an example collaboration service view within a mobile application user experience.

FIG. 3 includes a display diagram illustrating an example collaboration service view within a mobile application user experience.

As shown in a diagram 300, upon execution, of a mobile application associated with the collaboration service on a mobile device 302, a mobile application user experience 304 may be presented through a display of the mobile device 302. A collaboration service view 306 may initially be displayed within the mobile application user experience 304. The collaboration service view 306 may include one or more tabs positioned within a tab bar 308, such as a home tab 314, a sites tab 310, a people tab 312, a links tab 316, and a further option to view more tabs 318. As illustrated, the default tab displayed upon execution of the client application may be the home tab 314. One or more of a textual scheme, a graphical scheme, a formatting scheme, an animation scheme, a coloring scheme, a highlighting scheme, and or a shading scheme may be employed to indicate which tab is currently selected within the collaboration service view 306. The collaboration service view 306 may also include a notification feature 320 to alert users of any new updates or messages associated with the collaboration service and a search feature 322 to enable users to quickly and efficiently search for desired content within the collaboration service.

A user may be enabled to select another tab from the tab bar 308 through one of a touch action, an optically-captured gesture action, a movable input device action, a mouse input, a keyboard input, and/or an eye-tracking action associated with the other tab, among other types of user input. For example, the user may select the links tab 316 by contacting the display screen of the mobile device 302 with his finger 324 over the area in which the links tab 316 is located, as illustrated.

Figure 4:
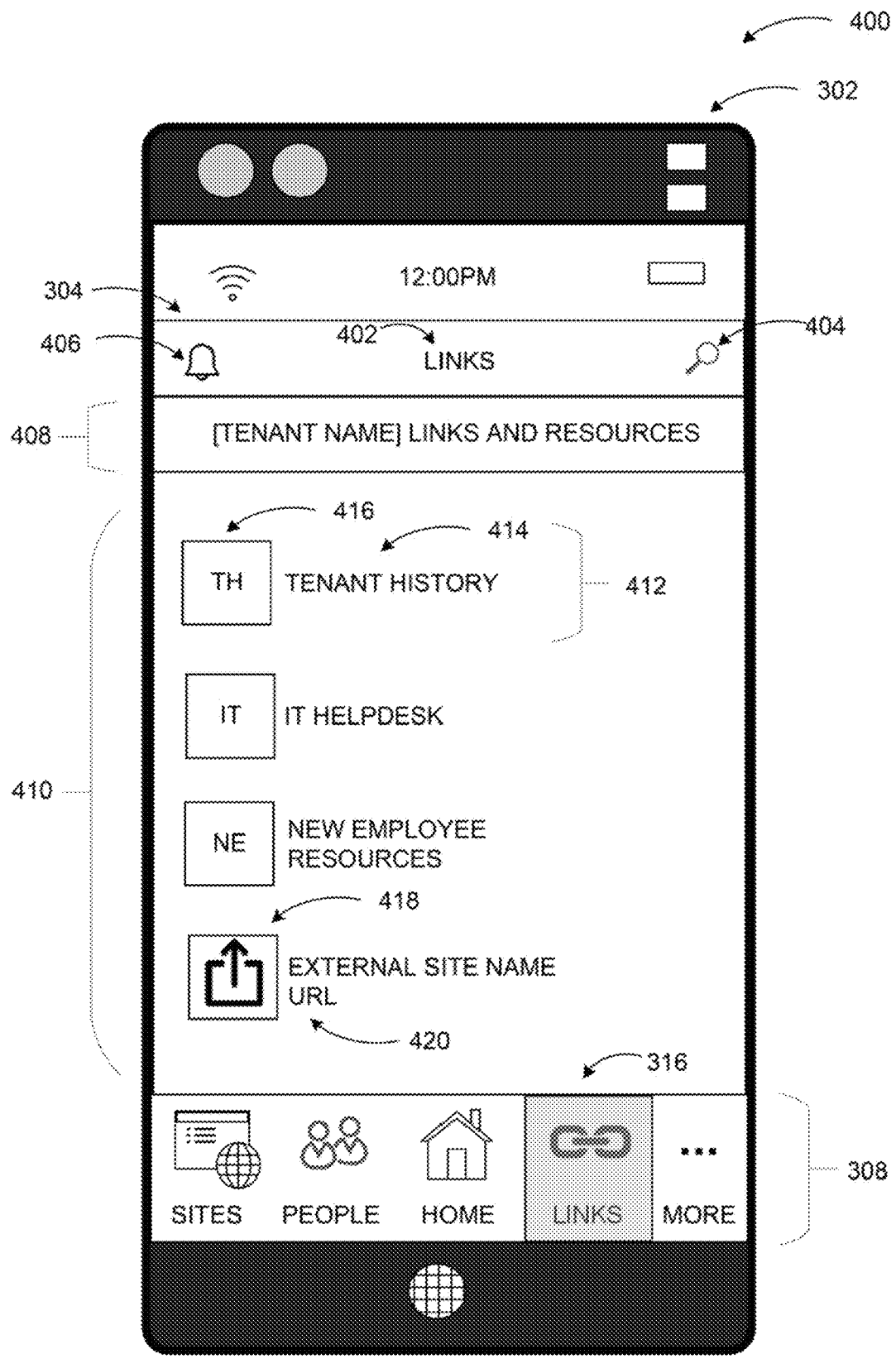
FIG. 4 includes a display diagram illustrating an example links tab view within a mobile application user experience for presenting links.

FIG. 4 includes a display diagram illustrating an example links tab view within a mobile user experience for presenting links.

As shown in a diagram 400, in response to detecting a user selection of the links tab 316 within the tab bar 308 of the collaboration service view, as discussed above in conjunction with FIG. 3, a links tab view 402 with a search feature 404 and a notification feature 406 may be displayed within the mobile application user experience 304. Similar to the notification and search feature within the collaboration service view, the notification feature 406 may alert users of any new updates or messages associated with the collaboration service and the search feature 404 may enable users to quickly and efficiently search for desired content within the collaboration service.

The links tab view 402 may include a header 408 and a list of sites 410. The header 408 may be structured as <tenant name> followed by "links and resources". The list of sites 410 may be comprised of a subset of links determined and provided by a management module of the collaboration service for presentation through the user experience of the mobile application to enable quick access to the most relevant content to users of the organization. For example, the subset of links may include sites that are being followed by the user and/or an organization associated with the user. The sites may include a portal of the organization, a team site associated with the organization, an external site, and/or an application among other examples.

Each site within the list of sites 410 may be presented as a card 412. For example, the card 412 may include a site name 414 and a site icon 416. The site name 414 may be displayed in full unless it contains too many characters, in which case the site name 414 may be truncated with an ellipsis. When available, the site icon 416 may be populated with a suitably sized image from the site. If not available, or if the image is not sized correctly, the site icon 416 may be created for the site. The created site icon 416 may include a color and one or more initials of the site name 414 (for example, an initial for the first and second words in the site name 414). An external site may be denoted with a special icon 418, and may be viewed in a web user experience, such as a browser, outside of the mobile application when actuated. An external site may also include a uniform resource locator (URL) 420 as subtitle text, where the URL 420 may be truncated by " . . . " in the middle.

An action applied to any area within the card 412 may launch the user into a corresponding page view for that site. The action may include a touch action, an optically-captured gesture action, a movable input device action, a mouse input, a keyboard input, and/or an eye-tracking action. The page view may be displayed in either the mobile application user experience 304 or a web user experience based on a type of the site. For example, a page associated with a team site may open in a native mobile user experience (for example, though a mobile client application), a page associated with a portal or publishing site may open in a hosted view of web user experience (for example, through a web application client), and an external sites may open in browser outside of the mobile application.

Figure 5:
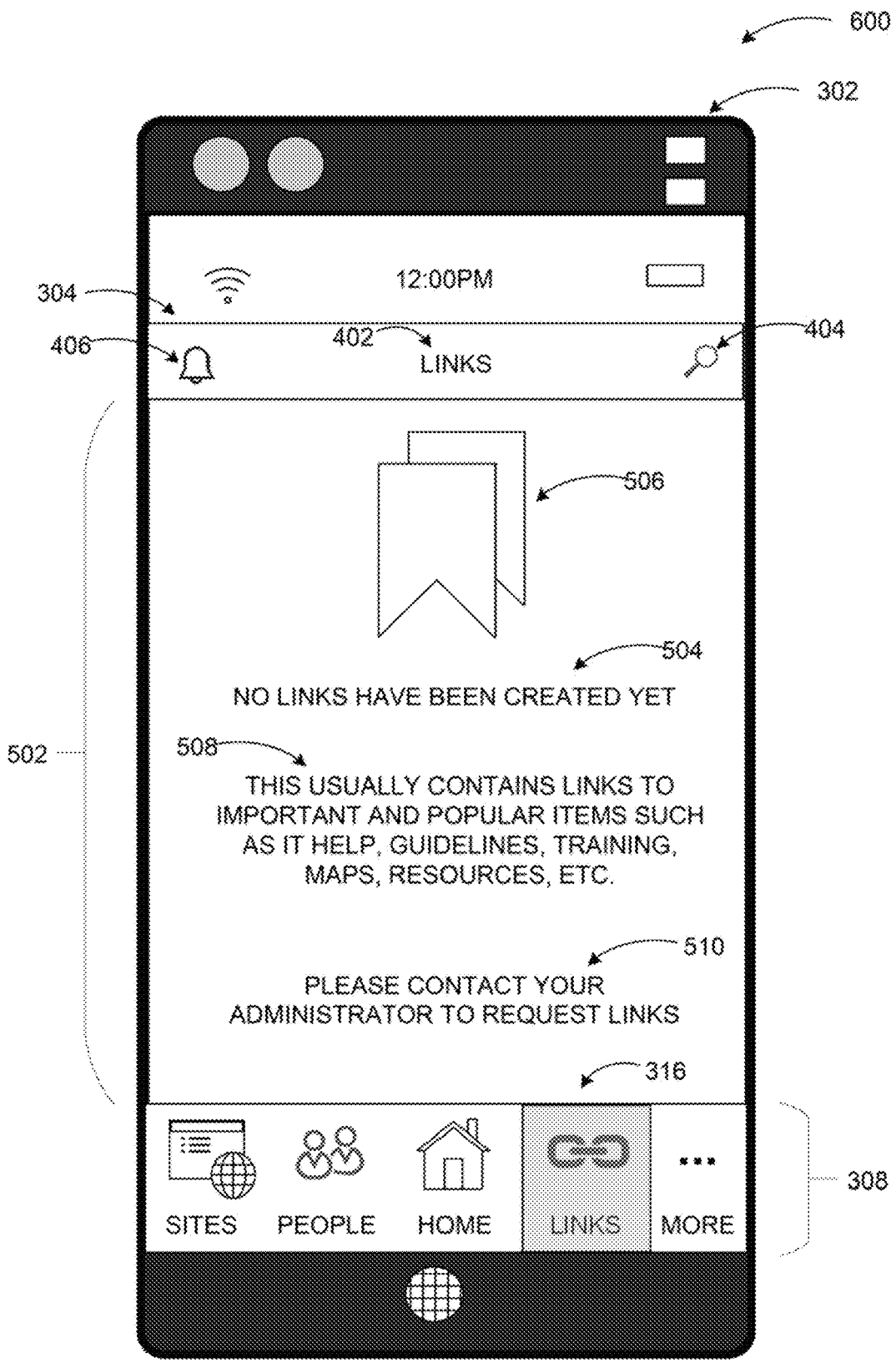
FIG. 5 includes a display diagram illustrating an example custom view within a mobile application user experience presented to a user when no links are accessible.

FIG. 5 includes a display diagram illustrating an example custom view within a mobile user experience presented to a user when no links are accessible. A management module associated with a collaboration service may be configured to program the organizational links that propagate to a mobile application. In some embodiments, when the management module provides a server side API to access one or more links and a web user experience associated with the one or more links, there may be no links for the API to access. In one example, a tenant of the collaboration service (for example, an organization) may be new, and thus no links have yet been curated. In another example, the tenant may have removed all of the existing content, and thus no links remain.

As shown in a diagram 500, when no links are accessible by the API, a custom view 502 may be displayed within the mobile application user experience 304. There may be two versions displayed including the custom view 502 presented to a user of the organization, as illustrated, and another custom view presented to N administrator described in detail in FIG. 6 below. The custom view 502 may be embedded within the links tab view 402 that includes the search feature 404 and the notification feature 406. Accordingly, the custom view 502 may be displayed in response to a user selection of the links tab 316 within the tab bar 308 of the collaboration service view when no links are accessible by the API.

The custom view 502 may include a textual description 504 that no links have been created, an empty page icon 506, details 508 about the links to educate the user, and a prompt 510 to encourage the user to request addition of links from their organization's administrator.

Figure 6:
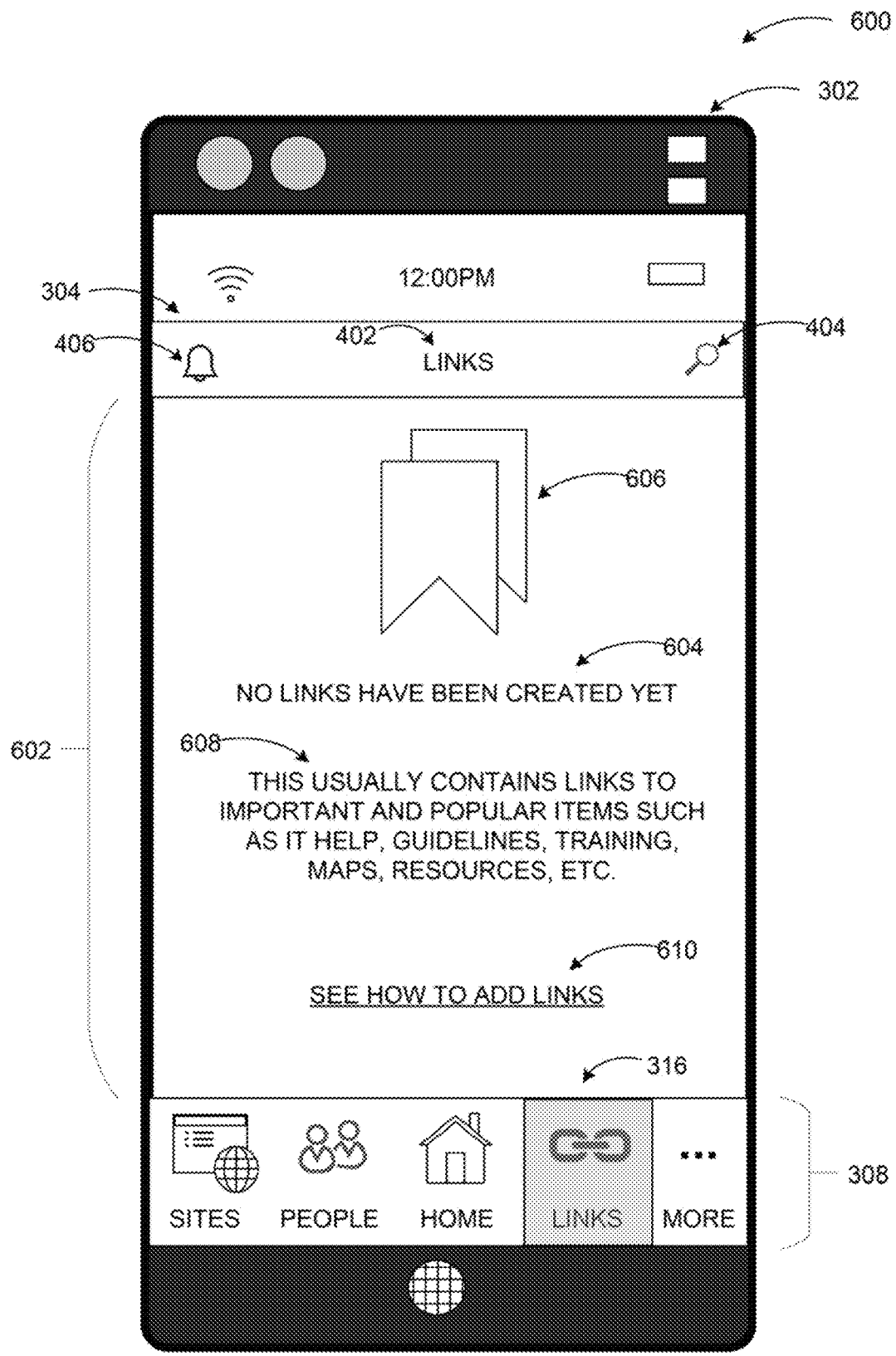
FIG. 6 includes a display diagram illustrating an example custom view within a mobile user experience presented to an administrator when no links are accessible.

FIG. 6 includes a display diagram illustrating an example custom view within a mobile user experience presented to an administrator when no links are accessible. As previously discussed in conjunction with FIG. 5, in some embodiments, when the management module provides a server side API to access one or more links and a web user experience associated with the one or more links, there may be no links for the API to access, find a custom view may be displayed within the mobile application user experience 304. There may be two versions displayed including the custom view presented to a user of the organization, as described in FIG. 5, and a custom view 602 presented to an administrator, as shown in diagram 600.

The custom view 602 may be embedded within the links tab view 402 that includes the search feature 404 and the notification feature 406. Accordingly, the custom view 602 may be displayed in response to a user selection of the links tab 316 within the tab bar 308 of the collaboration service view when no links are accessible by the API. The custom view 602 may include a textual description 604 that no links have been created, an empty page icon 606, details 508 about the links to educate the user, and a link 610 that the administrator may select to curate and add organizational links.

The examples provided in FIG. 1A through FIG. 6 are illustrated with specific systems, services, applications, modules, and user experiences. Embodiments are not limited to environments according to these examples. Programming of organizational links that propagate to mobile applications may be implemented in environments employing fewer or additional systems, services, applications, modules, and user experiences. Furthermore, the example systems, services, applications, modules, and user experiences shown in FIG. 1A through FIG. 6 may be implemented in a similar manner with other values using the principles described herein.

Figure 7:
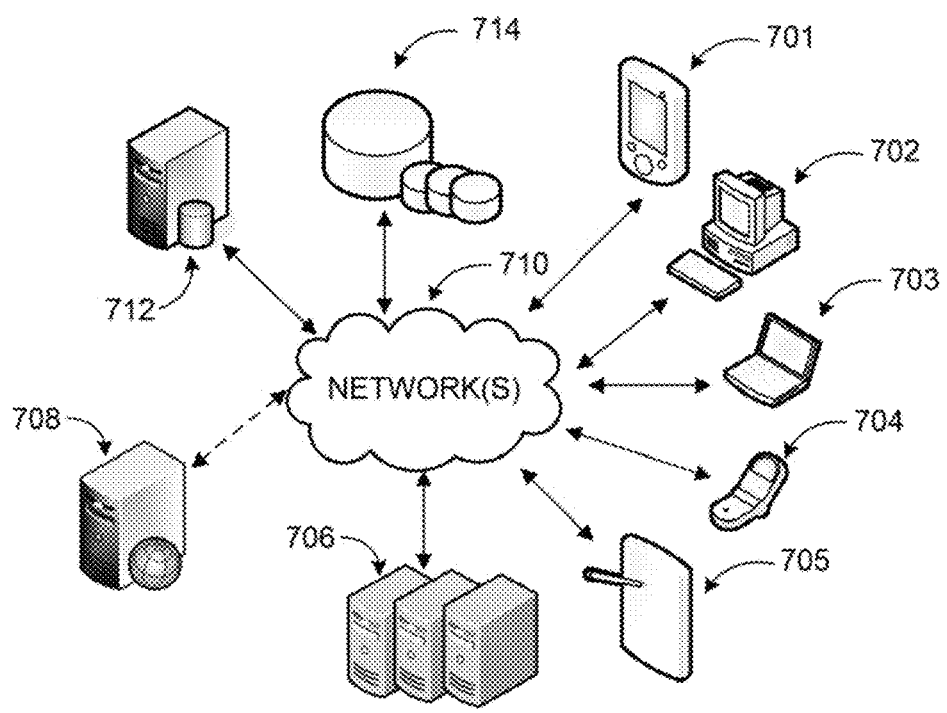
FIG. 7 is an example networked environment, arranged in accordance with at least some embodiments described herein.

FIG. 7 is an example networked environment, arranged in accordance with at least some embodiments described herein. In addition to locally installed applications (for example, mobile application 106), a management module urn also be employed in conjunction with hosted applications and services (for example, a collaboration service 114) that may be implemented via software executed over one or more servers 706 or individual server 708, as illustrated in diagram 700. A hosted service or application may communicate with client applications on individual computing devices such as a handheld computer 701, a desktop computer 702, a laptop computer 703, a smart phone 704, a tablet computer (or slate), 705 ('client devices') through network(s) 710 and control a user interface presented to users.

Client devices 701-705 are used to access the functionality provided by the hosted service or application. One or more of the servers 706 or server 708 may be used to provide a variety of services as discussed above. Relevant data may be stored in one or more data stores (e.g. data store 714), which may be managed by any one of the servers 706 or by database server 712.

Network(s) 710 may comprise any topology of servers, clients, Internet service providers, and communication media. A system according to embodiments may have a static or dynamic topology. Network(s) 710 may include a secure network such as an enterprise network, an unsecure network such as a wireless open network, or the Internet. Network(s) 710 may also coordinate communication over other networks such as PSTN or cellular networks. Network(s) 710 provides communication between the nodes described herein. By way of example, and not limitation, network(s) 710 may include wireless media such as acoustic, RF, infrared and other wireless media.

Many other configurations of computing devices, applications, engines, and modules may be employed to program organizational links that propagate to mobile applications. Furthermore, the networked environments discussed in FIG. 7 are for illustration purposes only. Embodiments are not limited to the example services, applications, engines, modules or processes.

Figure 8:
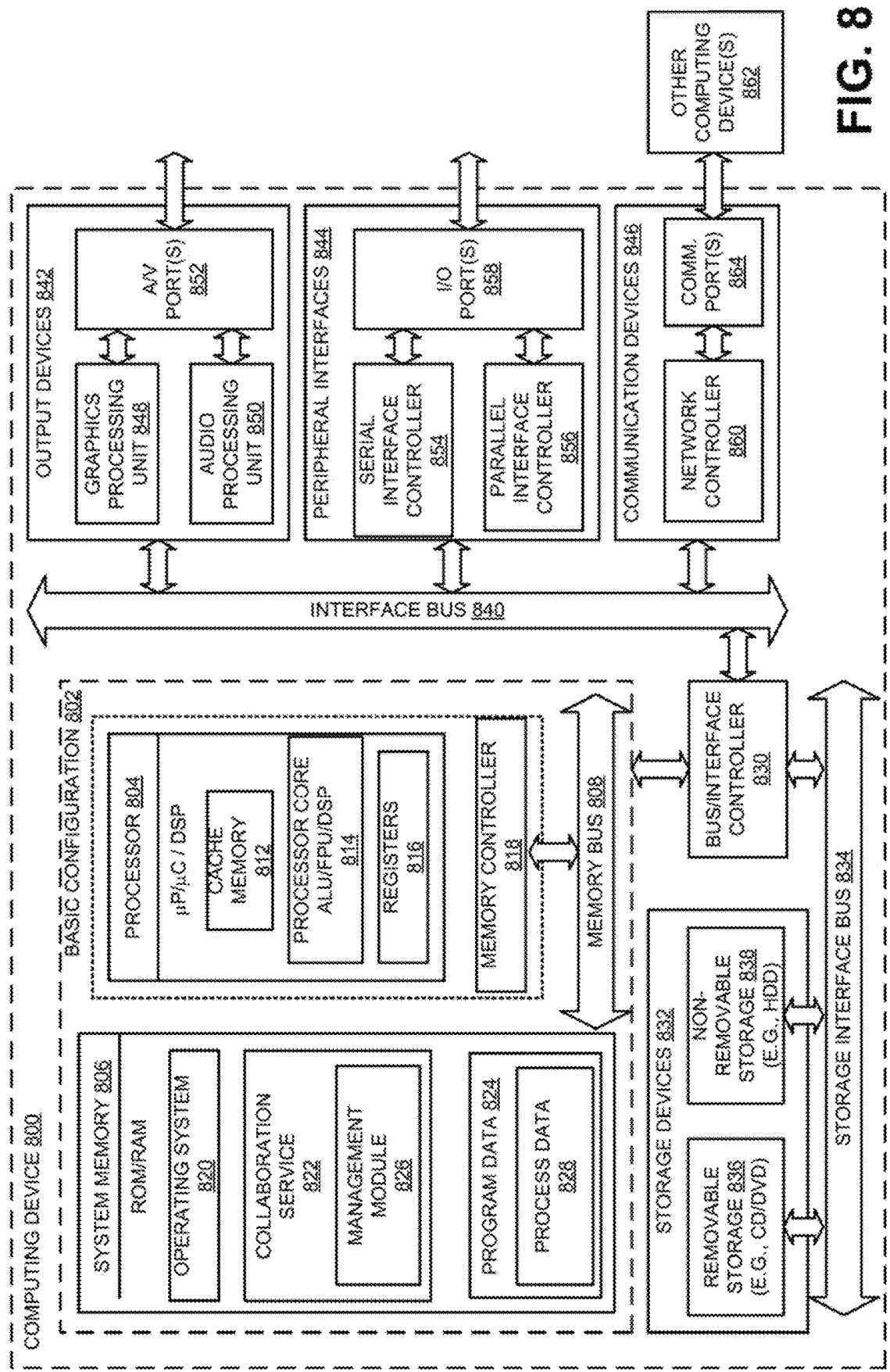
FIG. 8 illustrates a general purpose computing device, which may be configured to program organizational links that propagate to mobile applications arranged in accordance with at least some embodiments described herein.

FIG. 8 illustrates a general purpose computing device, which may be configured to program organizational links that propagate to a mobile application, arranged in accordance with at least some embodiments described herein.

For example, computing device 800 may be used as a server, desktop computer, portable computer, smart phone, special purpose computer, or similar device. In an example basic configuration 802, the computing device 800 may include one or more processors 804 and a system memory 806. A memory bus 808 may be used for communicating between the processor 804 and the system memory 806. The basic configuration 802 is illustrated in FIG. 8 by those components within the inner dashed line.

Depending on the desired configuration, the processor 804 may be of any type, including but not limited to a microprocessor ($\mu P$), a microcontroller ($\mu C$), a digital signal processor (DSP), or any combination thereof. The processor 804 may include one more levels of caching, such as a level cache memory 812, one or more processor cores 814, and registers 816. The example processor cores 814 may (each) include an arithmetic logic unit (ALU), a floating point unit (FPU), a digital signal processing core (DSP Core), or any combination thereof. An example memory controller 818 may also be used with the processor 804, or in some implementations the memory controller 818 may be an internal part of the processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, a collaboration service 822, and program data 824. The collaboration service 822 may include a management module 826, which may be an integrated module of the collaboration service 822. In other embodiments, the management module 826 may be an integrated module of a locally installed application of the collaboration service 822 or the management module 826 may be a separate module associated with a third party service configured to serve multiple applications of the collaboration service 822. The management module 822 may be configured to program organizational links that propagate to a mobile application. For example, the management module 822 may be configured to provide a server side API to access one or more links and a web user experience associated with the one or more links, determine a subset of links from the one or more links and a plurality of attributes associated with the subset of links, and provide the subset of links to the mobile application through the API based on the attributes to be presented through a user experience of the mobile application. The program data 824 may include, among other data, process data 828 such as the subset of links and the attributes associated with the links, as described herein.

The computing device 800 may have additional features or functionality, and additional interfaces to facilitate communications between the basic configuration 802 and any desired devices and interfaces. For example, a bus-interface controller 830 may be used to facilitate communications between the basic configuration 802 and one or more data storage devices 832 via a storage interface bus 834. The data storage devices 832 may be one or more removable storage devices 836, one or more non-removable storage devices 838, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, the removable storage devices 836 and the non-removable storage devices 838 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (for example, one or more output devices 842, one or more peripheral interlaces 844, and one or more communication devices 846) to the basic configuration 802 via the bus/interlace controller 830. Some of the example output devices 842 include a graphics processing unit 848 and an audio processing unit 850, which may be configured to communicate to various external devices such as a display or speakers via one or more A/V ports 852. One or more example peripheral interfaces 844 may include a serial interlace controller 854 or a parallel interface controller 856, which may be configured to communicate with external devices such as input devices for example, keyboard, mouse, pen, voice input device, touch input device, etc.) or other peripheral devices (for example, printer, scanner, etc.) via one or more I/O ports 858. An example communication device 846 includes a network controller 860, which may be arranged to facilitate communications with one or more other computing devices 862 over a network communication link via one or more communication ports 864. The one or more other computing devices 862 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a part of a general purpose or specialized server, mainframe, or similar computer that includes any of the above functions. The computing device 800 may also be implemented as a personal computer including both laptop computer and non-laptop computer configurations.

Example embodiments may also include methods to program organizational links that propagate to mobile applications. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, hut each can be only with a machine that performs a portion of the program. In other embodiments, the human interaction can be automated such as by pre-selected criteria that may be machine automated.

Figure 9:
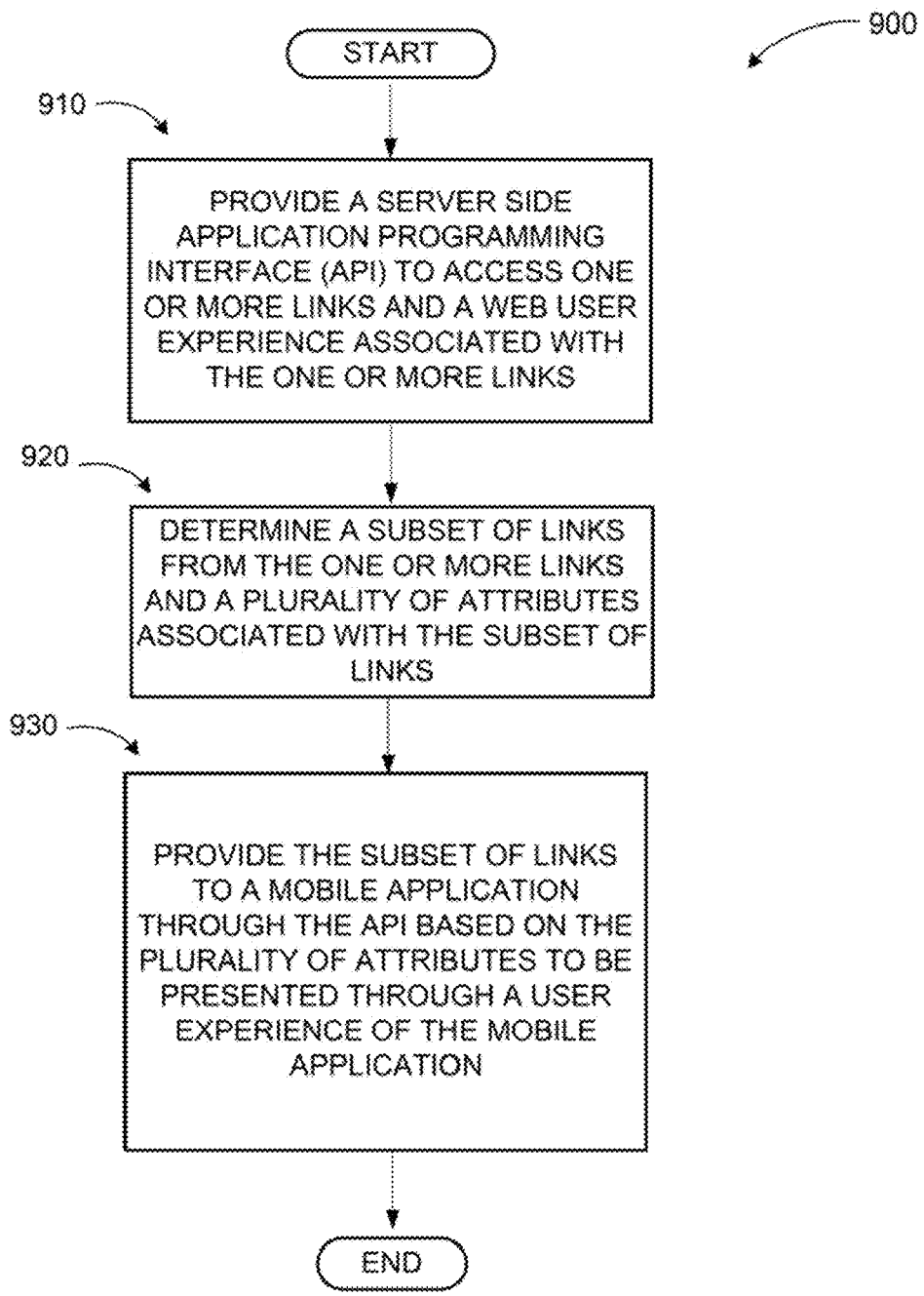
FIG. 9 illustrates a logic flow diagram for an example process to program organizational links that propagate to mobile applications, arranged in accordance with at least some embodiments described herein.

FIG. 9 illustrates a logic flow diagram for an example process to program organizational links that propagate to mobile applications, arranged in accordance with at least some embodiments described herein. Process 900 may be implemented on a computing device, server, or other system. An example system may include a server comprising a communication interface configured to facilitate communication between a collaboration service and a mobile application of the collaboration service that is being executed on a device, a memory configured to store instructions, and one or more processors coupled to the memory and the communication interface and configured to execute a management module. An administrator of an organization may curate organizational links that are provided as a hierarchical directory of sites and applications for the organization, where the organization may be a tenant of the collaboration service. The management module may be configured to program the organizational links that propagate to mobile applications.

Process 900 begins with operation 910, where the management module may be configured to provide a server side API to access one or more links and a web user experience associated with the one or more links. The API may be public, and consumed by the collaboration service 114 and mobile application 106. Therefore, the collaboration service 114 or the mobile application 106 may be able to directly call the API.

At operation 920, the management module may be configured to determine a subset of links from the one or more links and a plurality of attributes associated with the subset of links. For each link within the subset of links, a naming and a destination of the link may be determined. For example, a title and a category of each link may be determined, where the category may be based on a type of each link. Example types may include a service web link, a list link, a document link, a folder link, and/or an external web link. The attributes associated with the links may include an order of links, a platform for the links (for example, a mobile platform, a web platform, or both), a grouping of the links, and a priority of the links.

At operation 930, the management module may be configured to provide the subset of links to the mobile application through the API based on the attributes to be presented through a user experience of the mobile application. Provision of the subset of links for presentation through the user experience of the mobile application may enable quick access to the most relevant content to users of the organization. The mobile application may be a mobile client application or a web application client. If the mobile application is a mobile client application, then the user experience may be a with mobile user experience. If the mobile application is a web application client, then the user experience may be a hosted view of the web user experience.

The operations included in process 900 are for illustration purposes. Programming of organizational links that propagate to mobile applications may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a means to program organizational links that propagate to mobile applications are provided. Example means may include providing a server side API to access one or more links and a web user experience associated with the links, determining a subset of links from the links and a plurality of attributes associated with the subset of links, and providing the subset of links to a mobile application through the API based on the attributes to be presented through a user experience of the mobile application.

According to some embodiments, methods to program organizational links that propagate to mobile applications are provided. An example method may include providing a server side API to access one or more links and a web user experience associated with the links, determining a subset of links from the links and a plurality of attributes associated with the subset of links, and providing the subset of links to a mobile application through the API based on the attributes to be presented through a user experience of the mobile application.

In other embodiments, a user may be enabled to edit a link, add a new link, delete an existing link, and/or re-order links within the presented subset of links through the user experience of the mobile application. A type of each link within the subset of links may be determined, where the type may include a service web link, a list link, a document link, a folder link, and/or an external web link. A title and a category of each link within the subset of links may be determined. The title and the category of each link may be indexed to enable search features, auto-completion features, and auto-suggestion features. A custom view may be provided to the mobile application through the API to be presented through the user experience of the mobile application in response to a determination that no links are accessible. The custom view may prompt a user to add links or contact an administrator to request an addition of links.

In further embodiment, the attributes associated with the subset of links may include an order of links, a platform for the links, a grouping of the links, and a priority of the links. The priority of the links may be determined based on a geographical structure, and organizational structure, and a popularity of a link. The mobile application may be a mobile client application or a web application client. The user experience of the mobile application may be a native mobile user experience if the mobile application is the mobile client application. The user experience of the mobile application may be a hosted view of the web user experience if the mobile application is the web application client.

According to some examples, servers to program organizational links that propagate to mobile applications are described. An example server may include a communication interface configured to facilitate communication between a collaboration service and a mobile application of the collaboration service that is executed by a device, a memory configured to store instructions, and one or more processors coupled to the memory and configured to execute a management module. The management module may be configured to provide a server side API to access one or more links and a web user experience associated with the links, determine a subset of links from the links and a plurality of attributes associated with the subset of links, and provide the subset of links to the mobile application through the API based on the attributes to be presented through a user experience of the mobile application.

In other examples, the API may be public and consumed by the collaboration service and the mobile application such that the collaboration service and the mobile application are enabled to directly call the API. The user experience of the mobile application may display a service view, a tab view, and/or a page view. The tab view may display the subset of links as a list of sites, where each site within the list of sites may include a portal associated with an organization, a team site associated with the organization, an external site, and or an external application. The management module may be an integral module of the collaboration service, an integral module of the mobile application, and a separate module associated with a third party service configured to serve multiple clients hosted by the collaboration service.

According to some embodiments, methods to program organizational links that propagate to mobile applications are provided. An example method includes providing a server side API to access one or more links and a web user experience associated with the links, determining a subset of links from the links and a plurality of attributes associated with the subset of links, providing the subset of links to a mobile application through the API based on the attributes to be presented through a user experience of the mobile application, and enabling a link to be edited, a new link to be added, an existing link to be deleted, and/or links to be re-ordered within the presented subset of links through the user experience of the mobile application.

In other embodiments, a custom view may be provided to the mobile application through the API to be presented through the user experience of the mobile application in response to a determination that no links are accessible. The custom view may prompt a user to add links or contact an administrator to request an addition of links.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to program organizational links that propagate to mobile applications, the method comprising:
    providing a server side application programming interface (API) to access one or more links and a web-hosted user interface associated with the one or more links;
    determining a subset of links from the one or more links and a plurality of attributes associated with the subset of links, wherein the plurality of attributes include one or more attributes selected from the group consisting of an order of the links, a platform for the links, a grouping of the links, and a priority of the links;
    providing the subset of links to a mobile application through the server side API based on the plurality of attributes to be presented through a user interface of the mobile application; and
    enabling a user to one or more of edit a link, add a new link, delete an existing link, and re-order links within the presented subset of links.

2. The method of claim 1, further comprising:
    determining a type of each link within the subset of links, wherein the type includes one or more of a service web link, a list link, a document link, a folder link, and an external web link.

3. The method of claim 1, further comprising:
    determining a title and a category of each link within the subset of links.

4. The method of claim 3, further comprising:
    indexing the title and the category of each link to enable search features, auto-completion features, and auto-suggestion features.

5. The method of claim 1, further comprising:
    in response to a determination that no links are accessible, providing a custom view to the mobile application through the API to be presented through the user interface of the mobile application.

6. The method of claim 5, wherein the custom view prompts a user to one of add links or contact an administrator to request an addition of links.

7. The method of claim 1, wherein the priority of the links is determined based on a geographical structure, an organizational structure, and a popularity of a link.

8. The method of claim 1, wherein the mobile application is one of a mobile client application and a web application client.

9. The method of claim 8, wherein the user interface of the mobile application is a native mobile user interface if the mobile application is the mobile client application.

10. The method of claim 8, wherein the user interface of the mobile application is a hosted view of the web-hosted user interface if the mobile application is the web application client.

11. A server to program organizational links that propagate to mobile applications, the server comprising:
- a communication interface configured to facilitate communication between a collaboration service and a mobile application of the collaboration service that is executed by a device;
- a memory configured to store instructions; and
- one or more processors coupled to the memory and configured to execute a management module, wherein the management module is configured to:
- provide a server side application programming interface (API) to access one or more links and a web-hosted user interface associated with the one or more links;
- determine a subset of links from the one or more links and a plurality of attributes associated with the subset of links, wherein the plurality of attributes include one or more attributes selected from the group consisting of an order of the links, a platform for the links, a grouping of the links, and a priority of the links;
- provide the subset of links to the mobile application through the API based on the plurality of attributes to be presented through a user interface of the mobile application; and
- enable a user to one or more of edit a link, add a new link, delete an existing link, and re-order links within the presented subset of links.

12. The server of claim 11, wherein the API is public and consumed by the collaboration service and the mobile application such that the collaboration service and the mobile application are enabled to directly call the API.

13. The server of claim 11, wherein the user interface of the mobile application displays one or more of a service view, a tab view, and a page view.

14. The server of claim 13, wherein the tab view displays the subset of links as a list of sites.

15. The server of claim 14, wherein each site within the list of sites includes one or more of a portal associated with an organization, a team site associated with the organization, an external site, and an external application.

16. The server of claim 10, wherein the management module is one of:
- an integral module of the collaboration service;
- an integral module of the mobile application; and
- a separate module associated with a third party service configured to serve multiple clients hosted by the collaboration service.

17. A method to program organizational links that propagate to mobile applications, the method comprising:
- detecting a curation of one or more links to be provided as a hierarchical directory of sites and applications for an organization,
- providing a server side application programming interface (API) to access one or more links and a web-hosted interface associated with the one, or more links;
- determining a subset of links from the one or more links comprising content relevant to a user of the organization_ and a plurality of attributes associated with the subset of links, wherein the plurality of attributes include one or more attributes selected from the group consisting of an order of the links, a platform for the links, a grouping of the links, and a priority of the links;
- providing the subset of links to a mobile application through the API based on the plurality of attributes to be presented through a user interface of the mobile application; and
- enabling one or more of a link to be edited, a new link to be added, an existing link to be deleted, and links to be re-ordered within the presented subset of links through the user interface of the mobile application.

18. The method of claim 16, further comprising:
- in response to a determination that no links are accessible, providing a custom view to the mobile application through the API to be presented through the user interface of the mobile application, wherein the custom view prompts a user to one of add links or contact an administrator to request an addition of links.

* * * * *